Oct. 29, 1940.  N. J. RITZERT ET AL  2,219,399
BELT CONNECTOR
Filed Nov. 24, 1939  2 Sheets-Sheet 1
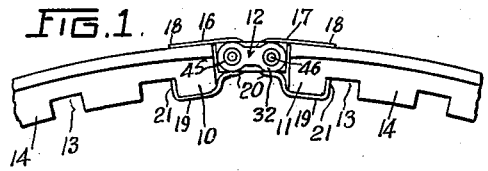
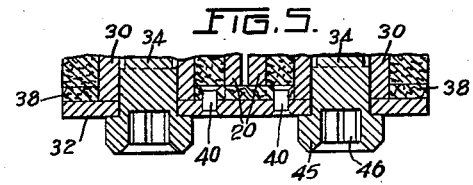
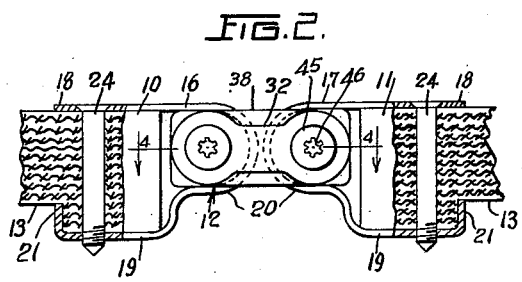
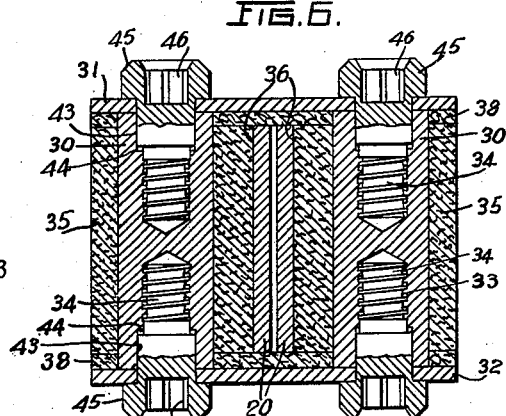
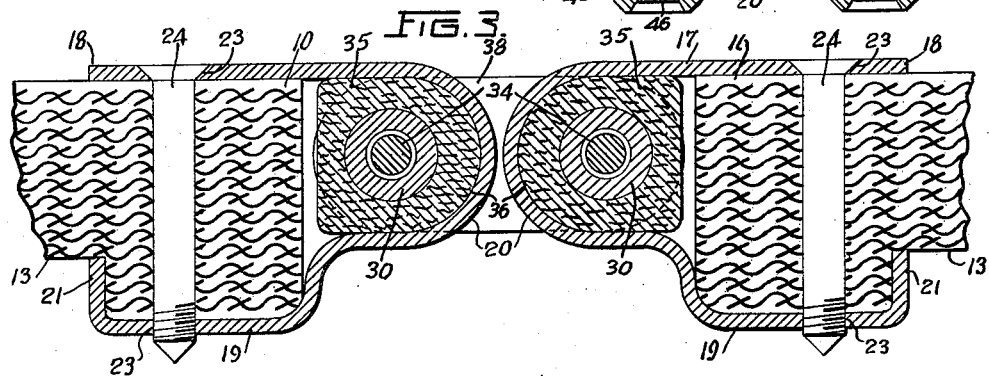
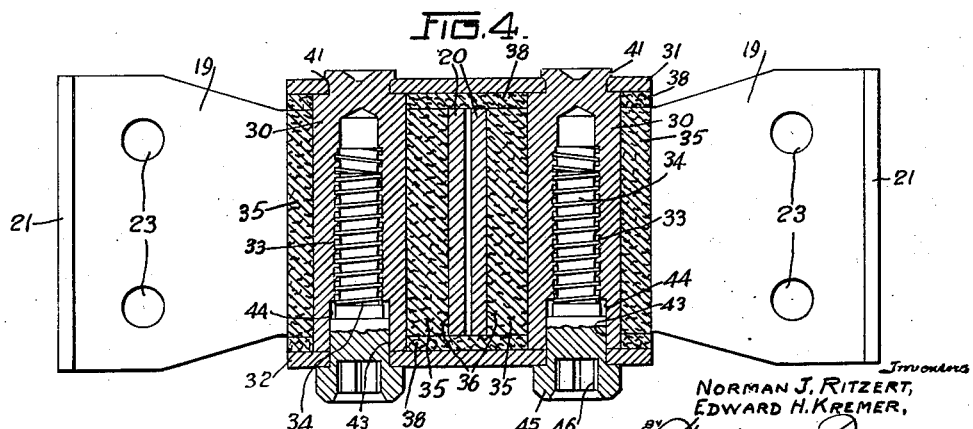
NORMAN J. RITZERT,
EDWARD H. KREMER,

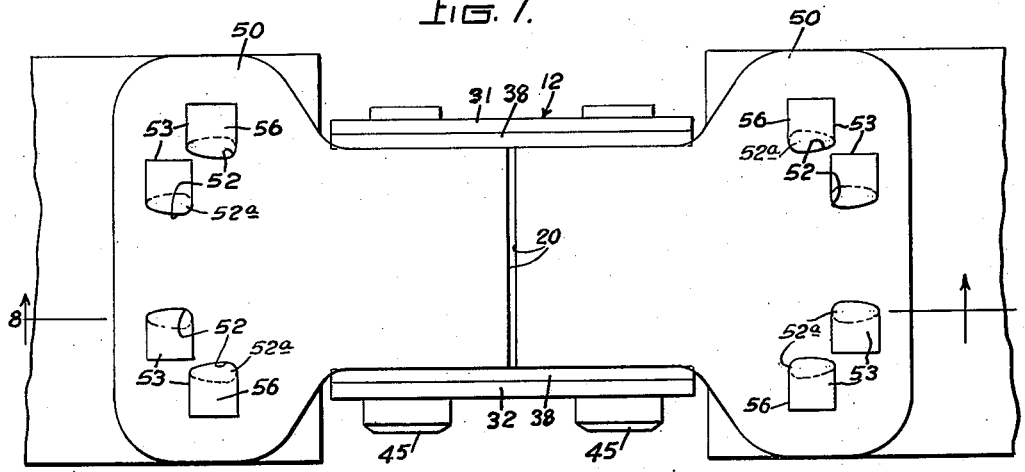
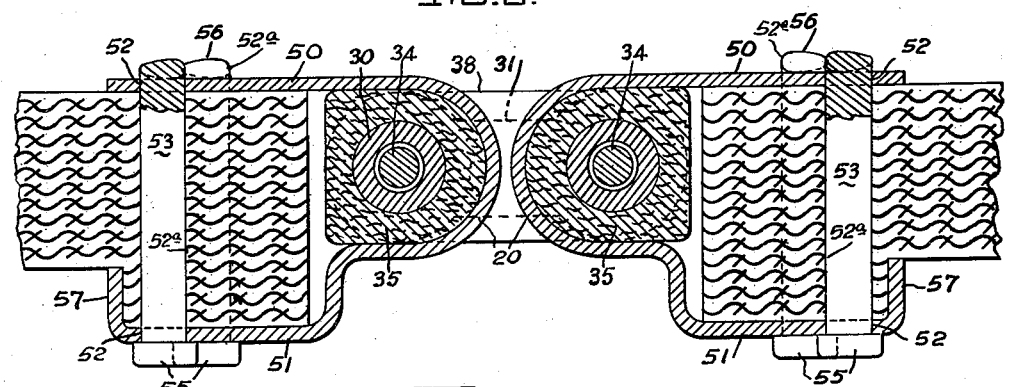
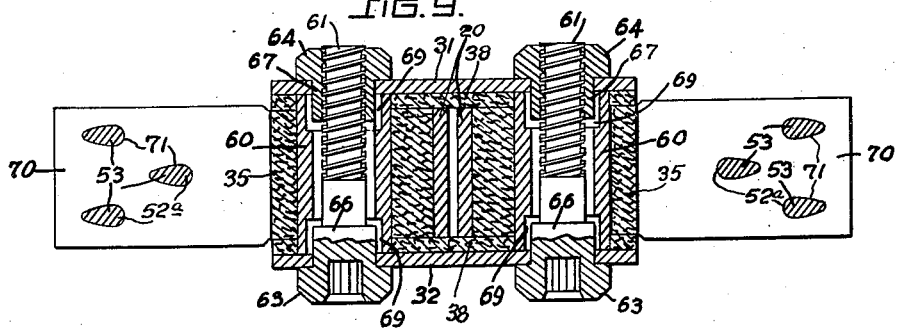

Patented Oct. 29, 1940

2,219,399

UNITED STATES PATENT OFFICE 2,219,399

BELT CONNECTOR

Norman J. Ritzert and Edward H. Kremer, Dayton, Ohio, assignors to The Dayton Rubber Manufacturing Company, Dayton, Ohio, a corporation of Ohio Application November 24, 1939, Serial No. 305,806

7 Claims. (Cl. 24—33)

This invention relates to belt connectors and particularly to an improved belt connector having a removable link and bearing assembly.

It is an object of this invention to devise a belt connector having removable bearings or bushings which are replaceable, when worn, while retaining the connector straps or bails and link assembly for further use.

Another object is to provide a connector of the character described such that the worn bearing parts and linkage assembly may be taken apart and replaced without removing the connector straps or clamps from the belt ends.

Another object is to provide a belt connector having improved construction wherein the center pin link and bearing parts are readily dissembled and replaceable.

Another object is to devise a belt connector which is easy to assemble. To this end the connector straps or bails may be fastened to the belt ends in the shop, and thereafter the belt is installed on the drive mechanism and the ends coupled together by positioning the removable link in place and inserting the threaded screws into the pins. This feature of construction is particularly advantageous when the connector straps are attached to the belt ends by means of nails or the like fastening members.

Another object is to provide a belt connector of improved construction comprising belt end straps interconnected by a removable link and pintle assembly.

Another object is to devise a connector of the type mentioned having two center pin members linked together forming a removable connecting link and bearing assembly for coupling a pair of belt end straps together. This construction facilitates the removal of the belts and connectors from the drive pulleys and associated mechanism.

Another object is to provide a belt connector comprising a pair of belt end clamping strap members interconnected by means of a removable link and center pin bearing assembly which is removably coupled together by means of self-locking stud screws.

These and other objects and advantages will appear from the following description of the invention taken in connection with the drawings, wherein:

Figure 1 is a side elevation view of the ends of a belt interconnected by a belt connector constructed according to this invention;

Figure 2 is a similar elevation view, partly in section, of the belt connector of this invention, and showing the connector strap attaching means;

Figure 3 is an enlarged vertical longitudinal section view taken through the belt ends and connector;

Figure 4 is a plan view of a horizontal sectional view taken substantially on the line 4—4 of Figure 2;

Figure 5 is a fragmentary detail view in section illustrating a modified construction of the belt connector;

Figure 6 is a plan view of a horizontal section, similarly as in Figure 4, showing an alternative belt connector construction;

Figure 7 is a top plan view of a belt connector similar in construction to that illustrated in Figure 4, but having non-circular apertured flange portions adapted for receiving nails, rivets or the like to fasten the strap to the belt body;

Figure 8 is a sectional view taken on the line 8—8 of Figure 7;

Figure 9 is a horizontal sectional view similar as in Figure 4, illustrating another modified form of belt connector construction.

Referring to the drawings in detail, Figure 1 shows the belt ends 10 and 11 joined by a connector of this invention generally designated 12. The belt as shown is provided with cutaway portions 13 forming tooth-like members 14 which are arranged along the underside which enhance the ready flexibility of the belt so that it can pass around small diameter pulleys without distorting the body of the belt. It will be understood, however, that the belt connector of this invention is applicable for connecting belts of any type construction, the particular belt structure shown being merely illustrative.

The belt connector of this invention consists of oppositely disposed clamp portions, straps or bails, generally designated 16 and 17, which members are suitably shaped to fit over the abutting end portions of the belt. To accommodate the belt structure illustrated, the strap 16 comprises a flat upper or outer flange 18 and a lower or inner flange 19 and an intermediate loop section 20 which is of somewhat narrower width than the outer flange portions 18 and 19.

At the rearward end of the lower flange 19 is an upturned section 21 which is directed towards the flange 18 and is disposed in the cutaway space 13 against the back of the tooth section 14 so as to firmly retain the strap onto the end of the belt. Spaced aligned apertures 23 are provided in the upper and lower flange portions 18 and 19 for receiving the screws 24 which pass through the belt end portions, as shown in Figures 3 and 4, so as to securely fasten the straps to the belt ends.

The loop portion 20 of the straps 16 and 17 serves to receive the hollow cylindrical pin means 30 which pins are secured together at their outer axial ends forming a link assembly by means of the interconnecting metal link end members 31 and 32, as illustrated in Figures 4 and 6. The pins 30 are formed of any suitable metal such as steel or the like and are preferably provided with a smooth machined cylindrical outer surface. The pins are drilled and tapped as shown at 33 to receive the threaded studs 34, as illustrated in Figure 4. Surrounding the pins 30 is a bearing bushing 35 which comprises an arcuate shaped surface portion 36 which is adapted to engage the inner surface portion of the loop 20 forming the straps 16 and 17.

The bearing bushing 35 is preferably formed of oil impregnated fiber, as illustrated in the drawings. The resiliency of the material forming the bushing provides a cushion for the relatively moving parts of the belt connector so as to reduce the wear therebetween and increase the life of the belt connector. Adjacent the outer ends of the bearing bushing 35 there is provided a fiber link washer 38 which may be made of similar material as the bushing. The metal and fiber link members can be used as separate parts, as illustrated in Figure 4, or they may be joined together in pairs by the use of rivets 40, as shown in Figure 5.

It will be appreciated that the metal link member and fiber washer means may be united together by riveting, cementing or in any other suitable manner. Fastening of the metal and fiber link members together provides a one-piece interconnecting link means which makes it easier to assemble the belt connector and eliminates the possibility of omitting the insertion of the fiber link washer when it is required during assemblage of the connector. It will, however, be obvious that this invention is not limited to the use of fiber link washer members since they may be dispensed with if desired, without departing from the spirit of this invention.

The center pins 30 and metal interconnect-link means 31 are preferably rigidly secured together as by riveting or otherwise expanding the end portions of the pins 30 against the member 31, as indicated at 41 of Figure 4. In this way the spaced center pins are linked together to one of the interconnecting metal link members so as to form a unitary link assembly for coupling the belt end strap members 16 and 17 together.

To disconnect the belt connector and remove the belt, it is only necessary to unscrew the stud screws 34 in the link assembly and remove the center pin assembly to uncouple the belt ends. This eliminates the necessity of removing nails or attaching means fastening the belt and straps to the belt, or cutting of the belt end portions.

The stud screws 34 are preferably formed of "Dardelet" thread which is a self-locking thread of conventional design which is capable of resisting vibrations and remaining tight without auxiliary locking means. The locking surfaces are effected by the use of a tapered root of the bolt thread and the tapered crest of the nut thread. The holes, of course, are made of similarly threaded "Dardelet" taps.

It will be understood, however, that when "Dardelet" screw threads are not utilized, other means for locking the pins in position may be used so long as the assembly does not work loose. The stud screws 34 comprise an enlarged cylindrical portion 43 which is adapted to fit into the enlarged bore portion 44 of the pins 30. Adjacent the cylindrical portion 43 is an integral head section 45 which is provided with a tool engaging countersunk portion 46. By the use of "Dardelet" thread the screws 34 when threaded into place are automatically locked so they do not work loose in service.

In the modification shown in Figure 6 the removable stud screws 34 are provided on both ends of the center pins 30 and the metal link members 31 and 32 are not fastened to the pins.

As shown in Figures 7 and 8 the belt connector may comprise straps having flange portions 50 and 51 which are provided with aligned apertures 52 for receiving nails 53 or similar fastening means. The apertures 52 are non-circular and are of tear-drop or wedge shaped cross-section and having the blunt end 52a toward the end of the belt as illustrated in Figure 7. The respective pairs of aligned apertures are adapted to receive a nail 53 which has a cross-section shape to fit the apertures 52. An enlarged head 55 of the nail engages the flange 51. The nails are adapted to be forced or driven through the end portions of the belt as shown in Figure 8 and the ends of the nails 56 are suitably bent over to engage the surface of the flange 50 to firmly lock the belt to the strap. The upturned flange members 57 are optional and are omitted when the belt or its ends are not provided with teeth or cog-like projections.

Figure 9 illustrates another modified construction wherein the coupling center pins comprise a sleeve member 60 which receives the screw bolt means 61. These screw bolts preferably have fluted-socket type heads 63 and are threaded on the opposite ends to receive the nuts 64. "Dardelet" threadlock may be used to prevent the nut from working loose. Interconnecting side link members 31 and 32 are firmly clamped together when the bolts 61 are screwed into the nuts 64. If desired the nut members 64 may be fixedly secured to the link 31 as by welding or other suitable manner.

The bolt head 63 and nut 64 comprise integral cylindrical portions 66 and 67 respectively, which engage in the enlarged bore sections 69 formed at the outer ends of the sleeve member 60 as illustrated in Figure 9. Rearward extending opposed flange members 70 are provided for attaching the connector sections to the abutting belt ends. Aligned spaced apertures 71 are made in the strap members 70 which are preferably of tear-drop shaped cross-section. Nails or rivet members 53 of corresponding cross-sectional shape are used for fastening the straps of the belt connector to the belt similarly as shown in Figures 7 and 8.

It will be understood that the above described structure of the belt connector is merely illustrative of the manner in which the principles of this invention may be utilized and that it is desired to comprehend within this invention such modifications as come within the scope of the disclosure and claims.

Having thus fully described our invention, what we claim as new and desire to secure by Letters Patent is:

1. In a belt connector, means for engaging over the ends of the belt, means arranged between said belt end members forming a link assembly for coupling the belt end members together, said link assembly comprising spaced center pins having bearing bushing associated therewith and interconnecting links joining the adjacent opposed ends of said spaced pins, one of said links being permanently fastened to said pins, and means associated with said pins for removably securing said pins to the other of said interconnecting links.

2. In a belt connector, belt end strap members for attaching to the ends of a belt, said strap members being spaced from each other and pivotally coupled together by means of a link and pintle assembly, said assembly comprising spaced center bearing pin members having interconnecting links engaging the outermost end portions of said pin members, one of said links being fixedly attached to the ends of said spaced center bearing pin members, and means associated with said pins for retaining said link and pintle assembly fastened to said belt end strap members.

3. In a belt connector, belt end strap members for attaching to the ends of a belt, said belt end members being pivotally coupled together by means of an interconnecting link and pintle assembly disposed therebetween, said assembly comprising spaced bearing pins provided with replaceable bearing bushings and removable fastening means for locking said pintle assembly to said belt end strap members to provide rocking engagement between the straps with positive holding against dislodgment, said bearing pins comprising a bolt and nut assembly.

4. In a belt connector, a pair of belt end clamping members, said belt end members comprising loops, said loop portion being adapted to receive hollow cylindrical center pin members, said pin members being secured together at their outer axial ends by an interconnecting link means to form a pintle link assembly, said pins being provided with bearing bushing means which are adapted to engage the inner surface portion of said loop strap, and means comprising fiber link washer means disposed adjacent said pin interconnecting link means.

5. In a belt connector, a pair of belt end members which are adapted to be attached to the ends of said belt in opposed relationship, a linkage assembly means comprising spaced center pins which are adapted to engage in the loop portions of said belt straps, interconnecting link means engaging the opposite ends of said pins and maintaining them in spaced relationship, at least one of said pins being fixedly united to one of said interconnecting metal link members, and means disposed on the opposite end of said pin means for removably fastening said pins to said oppositely disposed metal link means.

6. In combination, a pair of belt end clamping members, means comprising a pintle assembly for engaging said clamping members and coupling the same together, said pintles being drilled and tapped to receive self-locking screw members for removably fastening said pintles to said interconnecting link means, and bearing bushing means disposed around said pintle members for providing a bearing surface for the relatively movable parts.

7. In a belt connector, a pair of belt strap end engaging members, a replaceable linkage assembly comprising a sleeved pintle member positioned in each of said belt strap members, link means for interconnecting said sleeve members and means comprising removable bolt and nut means for securing said sleeves and interconnecting link means together to pivotally fasten the opposed belt end portions.

NORMAN J. RITZERT.
EDWARD H. KREMER.